(12) United States Patent
Fujiwara et al.

(10) Patent No.: US 7,698,688 B2
(45) Date of Patent: Apr. 13, 2010

(54) METHOD FOR AUTOMATING AN INTERNATIONALIZATION TEST IN A MULTILINGUAL WEB APPLICATION

(75) Inventors: Yayoi Fujiwara, Kanagawa (JP);
Yasuhisa Gotoh, Kanagawa (JP);
Yasutomo Nakayama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/057,431

(22) Filed: Mar. 28, 2008

(65) Prior Publication Data

US 2009/0248396 A1 Oct. 1, 2009

(51) Int. Cl.
*G06F 9/44* (2006.01)
*G06F 9/45* (2006.01)
*G06F 17/20* (2006.01)
*G06F 15/16* (2006.01)

(52) U.S. Cl. .................. 717/126; 717/124; 717/138; 704/8; 709/203

(58) Field of Classification Search ......... 717/124–138; 704/1–10; 709/201–203
See application file for complete search history.

(56) References Cited

U.S. PATENT DOCUMENTS

| | | | |
|---|---|---|---|
| 5,944,790 A * | 8/1999 | Levy | 709/218 |
| 6,092,035 A * | 7/2000 | Kurachi et al. | 704/3 |
| 6,119,078 A * | 9/2000 | Kobayakawa et al. | 704/3 |
| 6,311,151 B1 | 10/2001 | Yamamoto et al. | |
| 6,324,500 B1 * | 11/2001 | Amro et al. | 704/8 |
| 6,347,316 B1 * | 2/2002 | Redpath | 707/10 |
| 6,446,133 B1 * | 9/2002 | Tan et al. | 709/245 |
| 6,492,995 B1 * | 12/2002 | Atkin et al. | 715/703 |
| 6,507,812 B1 | 1/2003 | Meade et al. | |
| 6,519,557 B1 * | 2/2003 | Emens et al. | 704/8 |
| 6,526,426 B1 * | 2/2003 | Lakritz | 715/264 |

(Continued)

FOREIGN PATENT DOCUMENTS

| | | |
|---|---|---|
| JP | 8006781 | 1/1996 |
| JP | 2007-011586 | 1/2007 |
| JP | 2007-172377 | 7/2007 |
| JP | 2007-179431 | 7/2007 |

OTHER PUBLICATIONS

Huang et al., "Issues of Content and Structure for a Multilingual Web Site," Oct. 2001, ACM, p. 103-110.*

(Continued)

*Primary Examiner*—Wei Y Zhen
*Assistant Examiner*—Qing Chen
(74) *Attorney, Agent, or Firm*—Tutunjian & Bitetto, P.C.; Jill A. Poimboeuf

(57) ABSTRACT

A method and system for automatically executing an internationalization test of web applications by recording and utilizing HTTP transmitted and received data in the internationalization test in a multilingual web application. By processing and storing recorded HTTP transmitted and received data in a base language to prepare an HTTP request corresponding to a user specified test object language to a web server, a test is automatically executed while emulating user operations on the web browser in the test object language. This generates corresponding HTTP transmitted and received data in the test object language. By comparing and analyzing the HTTP transmitted and received data in the base language and test object language, a required verification for an internationalization test is automatically conducted and the verification results are stored or recorded for later use in subsequent operations.

1 Claim, 2 Drawing Sheets

U.S. PATENT DOCUMENTS

| | | | |
|---|---|---|---|
| 6,623,529 B1* | 9/2003 | Lakritz | 715/205 |
| 6,662,217 B1 | 12/2003 | Godfrey et al. | |
| 6,745,348 B2* | 6/2004 | Chung et al. | 714/47 |
| 6,859,820 B1* | 2/2005 | Hauduc et al. | 709/203 |
| 6,865,716 B1* | 3/2005 | Thurston | 715/207 |
| 6,904,401 B1* | 6/2005 | Hauduc et al. | 704/8 |
| 6,931,628 B2 | 8/2005 | McGeorge, Jr. | |
| 6,983,238 B2* | 1/2006 | Gao | 704/8 |
| 6,983,451 B2* | 1/2006 | Colaiuta | 717/125 |
| 6,993,471 B1* | 1/2006 | Flanagan et al. | 704/2 |
| 6,993,568 B1* | 1/2006 | Hauduc et al. | 709/217 |
| 6,999,916 B2* | 2/2006 | Lin et al. | 704/8 |
| 7,028,223 B1 | 4/2006 | Kolawaw et al. | |
| 7,139,696 B2* | 11/2006 | Tokieda et al. | 704/8 |
| 7,143,133 B2* | 11/2006 | Liu et al. | 709/203 |
| 7,181,700 B2* | 2/2007 | Guerrero | 715/810 |
| 7,191,393 B1* | 3/2007 | Chin et al. | 715/205 |
| 7,234,110 B2* | 6/2007 | Sumitomo | 715/234 |
| 7,251,674 B2* | 7/2007 | Banerjee et al. | 709/203 |
| 7,257,527 B2* | 8/2007 | Ertemalp et al. | 704/2 |
| 7,313,587 B1* | 12/2007 | Dharmarajan | 709/201 |
| 7,318,087 B2* | 1/2008 | Hauduc et al. | 709/217 |
| 7,334,220 B2 | 2/2008 | Chang et al. | |
| 7,437,406 B2* | 10/2008 | Hauduc et al. | 709/203 |
| 7,543,189 B2* | 6/2009 | Fichter et al. | 714/38 |
| 7,581,208 B2* | 8/2009 | Aoyama et al. | 717/124 |
| 7,607,085 B1* | 10/2009 | Lassesen | 715/264 |
| 2001/0029455 A1 | 10/2001 | Chin et al. | |
| 2002/0120762 A1 | 8/2002 | Cheng et al. | |
| 2002/0123878 A1* | 9/2002 | Menke | 704/2 |
| 2002/0162093 A1* | 10/2002 | Zhou et al. | 717/130 |
| 2002/0174196 A1* | 11/2002 | Donohoe et al. | 709/219 |
| 2002/0194300 A1* | 12/2002 | Lin et al. | 709/217 |
| 2003/0005159 A1* | 1/2003 | Kumhyr | 709/246 |
| 2003/0005364 A1* | 1/2003 | Chung et al. | 714/38 |
| 2003/0079051 A1* | 4/2003 | Moses et al. | 709/328 |
| 2003/0093465 A1* | 5/2003 | Banerjee et al. | 709/203 |
| 2003/0131049 A1* | 7/2003 | Banerjee et al. | 709/203 |
| 2003/0145278 A1* | 7/2003 | Nielsen | 715/511 |
| 2003/0212982 A1* | 11/2003 | Brooks et al. | 717/100 |
| 2004/0030781 A1* | 2/2004 | Etesse et al. | 709/225 |
| 2004/0049374 A1* | 3/2004 | Breslau et al. | 704/2 |
| 2004/0088155 A1* | 5/2004 | Kerr et al. | 704/8 |
| 2004/0128614 A1* | 7/2004 | Andrews et al. | 715/501.1 |
| 2004/0143631 A1* | 7/2004 | Banerjee et al. | 709/206 |
| 2004/0205118 A1* | 10/2004 | Yu | 709/203 |
| 2005/0086214 A1 | 4/2005 | Seewald et al. | |
| 2005/0114446 A1* | 5/2005 | Hauduc et al. | 709/203 |
| 2005/0149315 A1* | 7/2005 | Flanagan et al. | 704/2 |
| 2005/0187890 A1 | 8/2005 | Sullivan | |
| 2005/0192794 A1* | 9/2005 | Ertemalp et al. | 704/8 |
| 2005/0251562 A1* | 11/2005 | Hauduc et al. | 709/217 |
| 2006/0059132 A1 | 3/2006 | Zhang | |
| 2006/0080083 A1* | 4/2006 | Lin et al. | 704/8 |
| 2006/0218133 A1 | 9/2006 | Atkin et al. | |
| 2007/0136470 A1* | 6/2007 | Chikkareddy et al. | 709/226 |
| 2007/0233456 A1* | 10/2007 | Kim | 704/2 |
| 2008/0066057 A1* | 3/2008 | Aoyama et al. | 717/124 |
| 2008/0066058 A1* | 3/2008 | Aoyama et al. | 717/125 |
| 2008/0115111 A1 | 5/2008 | Chang et al. | |
| 2008/0120087 A1* | 5/2008 | Scanlan | 704/2 |
| 2008/0127103 A1 | 5/2008 | Bak | |
| 2008/0134015 A1* | 6/2008 | Milic-Frayling et al. | 715/206 |
| 2008/0288239 A1* | 11/2008 | Bailey et al. | 704/2 |

OTHER PUBLICATIONS

Brandon, Jr., Daniel, "Localization of web content," Dec. 2001, Consortium for Computing in Small Colleges, p. 345-358.*

Kraaij et al., "Embedding Web-Based Statistical Translation Models in Cross-Language Information Retrieval," Sep. 2003, MIT Press, p. 381-419.*

Sahama et al., "Developing and Delivering a Software Internationalisation Subject," Jan. 2004, Australian Computer Society, Inc., p. 199-204.*

Pérez-Quiñones et al., "Automatic Language Translation for User Interfaces," Oct. 2005, ACM, p. 60-63.*

Parr, Terence, "Web Application Internationalization and Localization in Action," Jul. 2006, ACM, p. 64-70.*

Hsieh et al., Effective agile delivery toward globalization, Globalization Shared Services, IBM, pp. 1-15. Oct. 2007.

* cited by examiner

METHOD FOR AUTOMATING AN INTERNATIONALIZATION TEST IN A MULTILINGUAL WEB APPLICATION

BACKGROUND

1. Technical Field

The present invention relates to web applications. More particularly, it relates an internationalization test in multilingual web applications.

2. Description of the Related Art

Methods of detecting garbled characters exist where visual inspection for a user is facilitated by figuring out a good way to handle the pseudo translation resource. Other methods and devices for internationalizing software or managing message resources of the software are also known. However, no know prior methods or systems related to automating the internationalization of software applications and the testing required for the same.

SUMMARY

According to one embodiment, the method for testing web application Internationalization, includes setting a base language at a web browser in communication with a web server, obtaining and storing HTTP (Hypertext Transfer Protocol) transmitted and received data between the web browser and the web server in the base language, analyzing the transmitted and received data in the base language and preparing an HTTP request corresponding to a user specified test object language to be sent to the web server to emulate user operations on the webs browser in the test object language to produce HTTP transmitted and received data in the test object language, comparing the HTTP transmitted and received data in the base language with the HTTP transmitted and received data in the test object language, verifying whether the web application is correctly internationalized based on said comparing, and storing the verified results when the web application is correctly internationalized.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
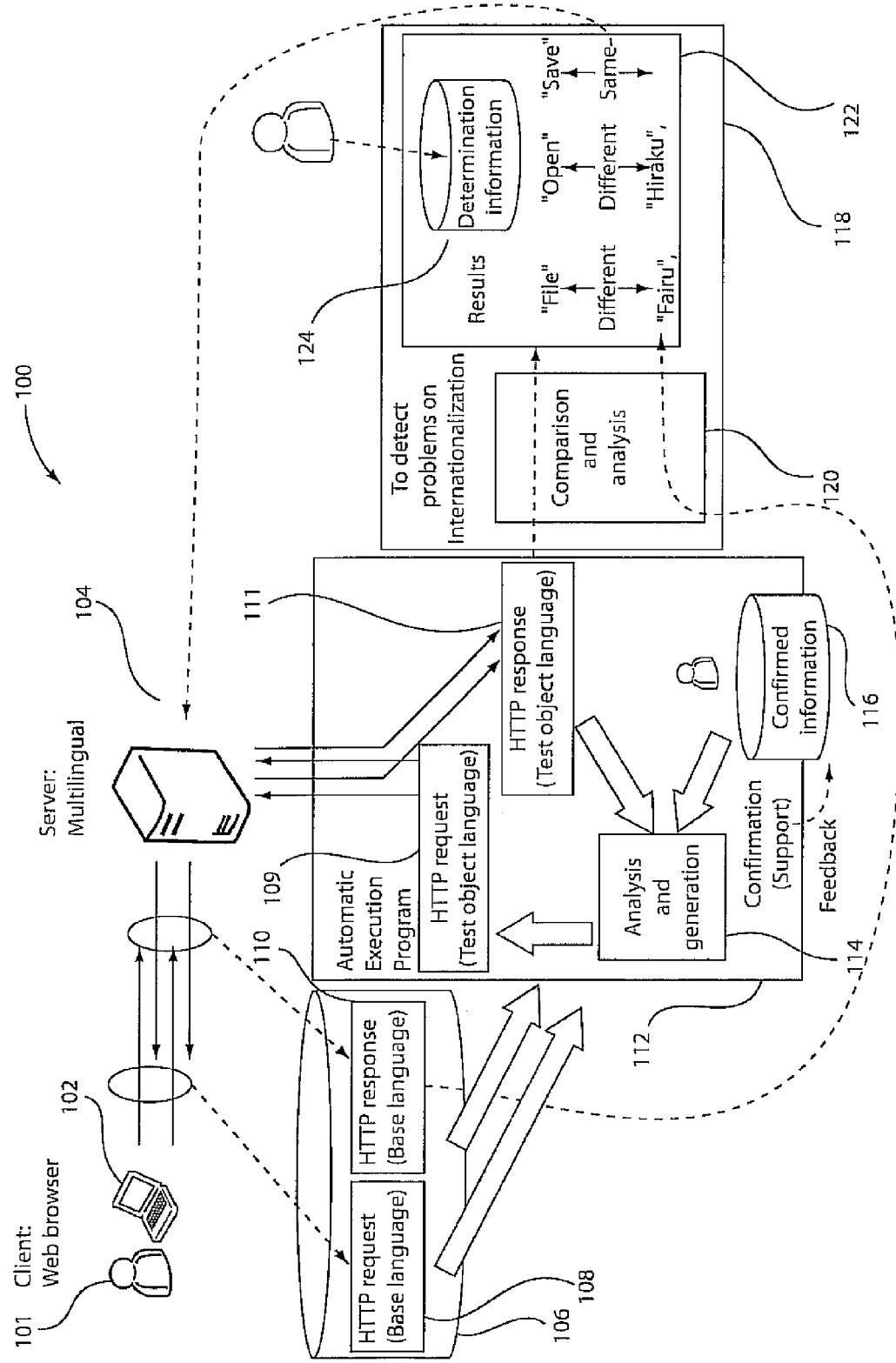
FIG. 1 is a schematic diagram of an embodiment of the mechanism of the present invention.

According to one embodiment, Internationalization testing is performed automatically without user intervention to check various strings of code for errors or abnormalities or other errors. According to other embodiments the testing analyzes transmitted and received data in a base language and prepares a corresponding transmitted and received data in a user designated test object language to emulate the user's action at a web browser. The prepared corresponding transmitted and received data in the test object language is compared with the base language representation of the same and it is verified whether the application is correctly internationalized.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

In general, when developing a multilingual web application, character strings displayed on a web browser screen of the client are provided as a language resource by being collected into a file called a resource bundle and a program code body is prepared to be independent of languages. Usually, these language resources are prepared by a base language (typically English) at first. Next, based on that, they are translated into other multiple languages and language resources for each language are prepared.

In a multilingual web application, users select a desired language using a language setting function of the web browser to transmit it to a server. In a web application on a server, a screen is prepared for the specified language by taking out and utilizing character strings from the language resource corresponding to the language specified by the user.

In order to verify whether software is correctly internationalized, a test can be performed under multiple language environments. This test is referred to as an internationalization test. Examples of verification items are: whether no abnormality (e.g., garbled characters) is observed on the display through a conversion of character codes and handling of fonts; whether language resources are correctly separated from a program code and not hard-coded therein; whether there is no translation omission in the language resource; and whether data of character strings expressed by the test object language can be inputted and outputted without problems.

When checking hard codes and translation omission, a method is adopted, in which the screen is displayed in a language other than the base language and a tester seeks a part where character strings of the base language are displayed as they are visually observing the screen. However, there are problems with this visual inspection method.

Since the character strings displayed by the base language are visually checked, the character strings can be overlooked.

As a result of this visual inspection, things such as the menu and panel have to be manually displayed in order. This increases user workload such that when tested again after correcting problems, the same procedure has to be executed.

Furthermore, at the stage of performing an internationalization test, since, in most cases, translation is not completed yet, there is no language resource whose translation into each language is completed. Therefore, in many cases, visual inspection is conducted using a pseudo translation resource, which is automatically generated from a language resource of the base language.

Referring now in detail to the figures in which like numerals represent the same or similar elements and initially to FIG. 1.

User (101) operations are recorded by hooking and obtaining communication content between the web browser 102 and web server 104. Since user operations are recorded in a data storage device 106 with the language setting of the web browser 102 being the base language (for example, English), the menu and panel that include the character strings of the base language are also recorded. When recording user operations, comprehensive operations are performed that display the menu and panel to be checked. As for the method of hooking communication content (HTTP transmitted (i.e., HTTP request 108) and received (i.e., HTTP response 110) data) between the web browser 102 and web server 104 in operation, some methods are conceivable such as obtaining it from the client (i.e., web browser 102), from the proxy server (not shown), and from the web server 104, however, no limitation is imposed here.

In order to obtain the same screen display by the test object language (For example, Japanese) as that of when recording the user operation, user operations are reproduced by interacting with the web server 104 using an automatic execution program 112 in place of the web browser 102. Thereby, an HTTF request 109 transmitted to the web server 104 is automatically prepared by processing and converting communication data by the recorded base language. When there is a portion that cannot be automatically prepared through the analysis and generation 114, the automatic execution program 112 is temporarily stopped and the user's indication is asked for. Then, indication results are recorded as confirmation information 116 and utilized in the following reproduction.

After completing user operations reproduction by the test object language, problems are detected on internationalization problem detector (118) by comparing and analyzing 120, 122 the recorded content in the case of the base language and those of the test object language. The comparison and analysis 120,122 and detection are conducted on a DOM level by converting HTML data included in an HTML response into a DOM format. Character string data included in such as a text node and attribute node situated in a corresponding position on a DOM tree are compared 122 in order and when a completely compatible character string is found, it is presented to the user as "a part whose hard code is in question" or "a part in which translation omission is suspected." In the first place, since there is a case (for example, the "OK" button) in which the same text is displayed both in English and in Japanese, a final determination whether it is a "translation omission" or not is conducted by the user. The user confirms presented content to determine whether it is problematic. Confirmation results by the user are recorded (124) and by utilizing them at the time of detection thereafter in order to suppress detection of useless problematic parts, it becomes possible to improve detection precision of the problematic part.

While referring to final verification results, the user modifies the language resource and program code of the web application, deploys the modification results to the web server 104, performs the automatic test again, and confirms that problems are corrected. The operation is continued until no problem is found on the internationalization.

In general, as the development of web applications to be the test object advances, builds for the test are successively released. Each time, the automatic test can be performed, the burden in the internationalization test can be greatly reduced.

As a further explanation on the automatic execution program 112, in order to emulate user operations by the test object language, an HTTP request 109 transmitted to the web server is prepared using information as follows:

HTTP request by the base language when recording user operations (transmitted data such as GET and POST);

HTTP response by the base language when recording user operations (contents displayed on the screen); and HTTP response (111) obtained during reproducing user operations by the test object language (contents displayed on the screen).

Firstly, the HTTP request by the base language is taken out and information (Accept-Language and Accept-Charset, etc.) on the language included in an HTTP header is re-written so that the test object language is specified. Using information transmitted from the web server at the time of the automatic execution, the content of a cookie header used for a session management is re-written as well.

Next, among the content of the form data included in the HTTP request, that which is necessary to change from the description in the base language to those in the test object language are rewritten. This is conducted by comparing and analyzing form definitions included in the HTTP response by the base language and those by the test object language.

An example in a WebSphere® Application Server management console is shown below. WebSphere® is a registered trademark of International Business Systems for computer software for website development.

When extracting and comparing a form definition of the HTTP response in the base language (English) of (A) and that in the test object language (Japanese) of (B), it is confirmed that values of an attribute or an element differ by languages. In this example, while it is "New" in the base language, it is changed into "Shinki-sakusei" (Translated in Japanese) in the test object language. Therefore, it is found that when the submit button of the form is pressed the content of the HTTP request transmitted to the web server has to be changed as well.

(A) Form definitions (excerpt) of the HTTP response in the base language (English) obtained when recording user operations:

```
:
<form name =
"com.ibm.ws.console.enviroment.VirtualHostCollectionForm"
method="post"...
:
<input type="submit" name="button.new"value="New" class=
"buttons" id="functions"/>
:
```

(B) Form definitions (excerpt) of the HTTP response in the text object language (Japanese) obtained at the time of automatic execution:

```
   :
<form name =
"com.ibm.ws.console.enviroment.VirtualHostCollectionForm"
method="post"...
   :
<input type="submit" name="button.new"value="□□□□" class=
"buttons" id="functions"/>
   :
```

Based on such comparison and analysis results and the HTTP request in the base language (English) of (C), it is possible to prepare the HTTP request in the test object language (Japanese) like (D) as shown below. In this example, by changing values (character strings of "Shinki-sakusei" are encoded) set by a button.new included in an Accept-Language header, Content-Length header, and query string, it is possible to emulate user operations in the test object language.

(C) HTTP request in the base language (English)

```
POST/admin/virtualHostCollection.do HTTP/1.0
Accept: image/gif, image/x-xbitmap, image/jpeg, image/pjpeg,
application/x-shockwave-flash, application/vnd.ms-excel,
application/vnd.ms-powerpoint, application/msword, */*
Referer: http://localhost/admin/navigatorCmd.do?forwardName=
VirtualHost.content.main
Accept-Language: en
Content-Type: application/x-www-form-urlencoded
User-Agent: Mozilla/4.0 (compatible; MSIE 6.0; Windows NT 5.1;
SV1; .NET CLR 1.1.4322)
Host: localhost
Content-Length: 66
Connection: Keep-Alive
Prgama: no-cache
Cookie: JSESSIONID=0000mbSHI6qihHPwFFuWzr6CbNi:-1
button.new=New&definitionName=VirtualHost.collection.buttons.panel
```

(D) HTTP request in the test object language (Japanese)

```
POST/admin/virtualHostCollection.do HTTP/1.0
Accept: image/gif, image/x-xbitmap, image/jpeg, image/pjpeg,
application/x-shockwave-flash, application/vnd.ms-excel,
application/vnd.ms-powerpoint, application/msword, */*
Referer: http://localhost/admin/navigatorCmd.do?forwardName=
VirtualHost.content.main
Accept-Language: ja
Content-Type: application/x-www-form-urlencoded
User-Agent: Mozilla/4.0 (compatible; MSIE 6.0;
Windows NT 5.1; SV1; .NET CLR 1.1.4322)
Host: localhost
Content-Length: 66
Connection: Keep-Alive
Prgama: no-cache
Cookie: JSESSIONID=0000mbSHI6qihHPwFFuWzr6CbNi:-1
button.new=
%E6%96%B0%E8%A6%8F%E4%BD%9C%E6%88%90&definitionName=
Virtual Host.collection.buttons.panel
```

Figure 2:
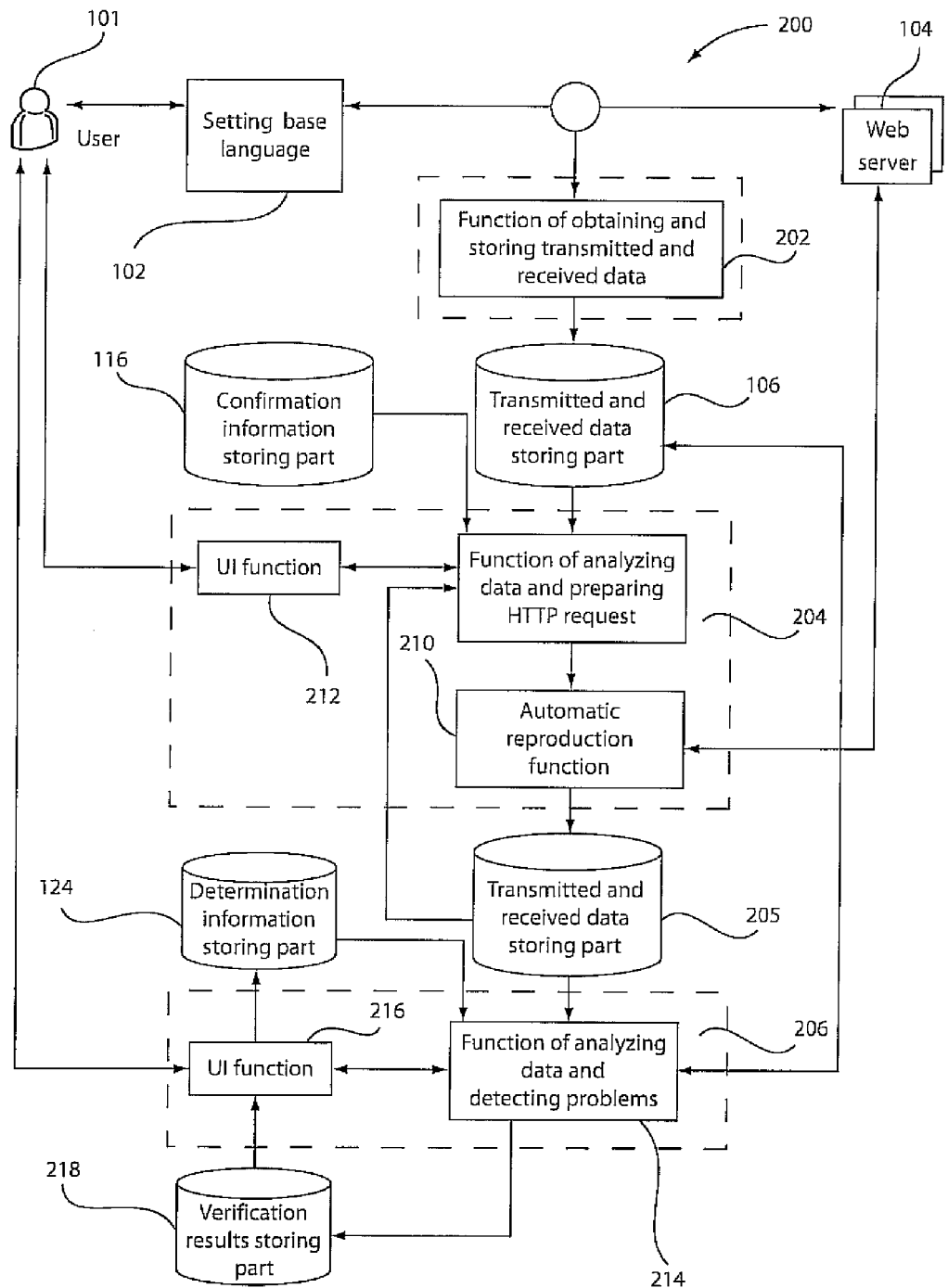
FIG. 2 is an exemplary flow diagram of an embodiment of the method of the present invention.

Referring to FIG. 2, there is shown an exemplary configuration method 200 according to an embodiment. As mentioned above, the user 101 through web browser 102 sets the base language and also the test object language. In step 202, the HTTP request and HTTP response transmitted and received (data) between the web browser 102 and the web server 104 are automatically obtained and stored in a transmitted and received data storing part 106. As mentioned with respect to FIG. 1, this function is implemented, for example, on the web browser, web server, or a proxy server (not shown).

Step 204 includes the function of analyzing the data and preparing an HTTP request. At this step, recorded and transmitted HTTP data is analyzed and the necessary HTTP requests are prepared for the automatic test in the test object language specified by the user. When there are parts that cannot be prepared by the program, the automatic execution is temporarily stopped and user indication is requested via the UI function 212. Then, the user's input confirmation information is stored in a confirmation information storing part 116 and utilized after the following data analysis and at the time of preparing the HTTP request (109). The automatic reproduction function 210 automatically interacts with the server 104 in place of the web browser to emulate the user operation. The transmitted and received data in the text object language obtained is then stored in the transmitted and received data storing part 205.

In step 206, the function of analyzing data and detecting problems (214) is performed. Here, the transmitted and received data in the base language (from storage 106) and transmitted and received data in the test object language (from storage 205) are compared and analyzed and it is verified whether the web application is correctly internationalized.

Verification results are stored in the verification results storing part 218. The verification results are presented to the user using a UI function 216, where it is confirmed and indicated by the user whether there are problems on the internationalization such a hard codes and translation omission. Confirmation results by the user are stored in the determination information storing part 124 and utilized after the following comparison and analysis.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for testing a web application internationalization, the method comprising the steps of:
    setting a base language at a web browser in communication with a web server;
    obtaining and storing raw HTTP (Hypertext Transfer Protocol) transmitted and received data between the web browser and the web server in the base language;
    analyzing the raw HTTP transmitted and received data in the base language and preparing an HTTP request corresponding to a user specified test object language to be sent to the web server to emulate user operations on the web browser in the user specified test object language to produce HTTP transmitted and received data in the user specified test object language, wherein the preparation of the HTTP request includes prompting a user for input in response to an encountered problem with the preparation of the HTTP request;

comparing, without user intervention, the raw HTTP transmitted and received data in the base language with the raw HTTP transmitted and received data in the user specified test object language on a DOM (Document Object Model) level by converting the raw HTTP transmitted and received data in the base language and the raw HTTP transmitted and received data in the user specified test object language into a DOM format;

verifying, without user intervention, whether the web application is correctly internationalized based on said comparing; and storing results from said verifying when the web application is correctly internationalized.

\* \* \* \* \*